(12) United States Patent
Gotti et al.

(10) Patent No.: US 7,195,108 B2
(45) Date of Patent: Mar. 27, 2007

(54) CALIPER DISC BRAKE PROTECTIVE DEVICE AND CALIPER DISC BRAKE

(76) Inventors: Aṅtonio Gotti, Via Ponte della Noca, 12 - I-24031, Almenno San Salvatore (IT); Giovanni Fattori, Via Brusocchi, 32 - I-24040, Fornovo San Giovanni (IT); Lorenzo Nessi, Via Carducci, 316 - I-24128, Bergamo (IT)

( * ) Notice: Subject to any disclaimer, the term of this patent is extended or adjusted under 35 U.S.C. 154(b) by 0 days.

(21) Appl. No.: 10/487,876

(22) PCT Filed: Nov. 28, 2002

(86) PCT No.: PCT/IT02/00747

§ 371 (c)(1), (2), (4) Date: Feb. 23, 2004

(87) PCT Pub. No.: WO2004/048798

PCT Pub. Date: Jun. 10, 2004

(65) Prior Publication Data

US 2004/0238296 A1    Dec. 2, 2004

(51) Int. Cl.
*F16D 55/228*    (2006.01)
(52) U.S. Cl. .......................... 188/264 CC; 188/264 G
(58) Field of Classification Search .... 188/72.1–73.45, 188/264 CC, 264 D, 264 R, 264 G
See application file for complete search history.

(56) References Cited

U.S. PATENT DOCUMENTS 5,560,457 A    10/1996    Rike ........................ 188/352

FOREIGN PATENT DOCUMENTS

| JP | 63152733 | 6/1988 | .................. 55/228 |
| JP | 07119772 | 5/1995 | .................. 55/228 |
| JP | 7233825 | 9/1995 | .................. 55/224 |

*Primary Examiner*—Christopher P. Schwartz
(74) *Attorney, Agent, or Firm*—Sofer & Haroun, LLP (57) ABSTRACT

The protective device can be associated with a caliper body of a disc-brake caliper having a median plane of the caliper body which can be superimposed on a median plane of the disc arranged perpendicularly relative to an axis of rotation of the disc, the caliper body being arranged with a central portion astride the brake disc so that side walls thereof are arranged on opposite sides of the disc, the side walls of the central portion being connected to side portions so that the side portions are at least partially at the sides of the disc, each of the side portions comprising an opening of a hydraulic brake-fluid circuit defining an opening center, the openings being in fluid communication with one another by means of a brake-fluid pipe arranged astride the central portion, the pipe supplying brake fluid between the side portions, the protective device comprising a shell for protecting the brake-fluid pipe and fixing means for fixing the shell to the caliper body, wherein the fixing means comprise at least one plate which, when the protective device is in the fitted configuration on the caliper body in order to arrange the shell so as to protect the brake-fluid pipe, faces and abuts at least one bearing surface of the central portion of the caliper body, the distance between the points of the at least one bearing surface of the caliper body from the median plane of the caliper body being less than the distance between the median plane of the caliper body and the opening center of at least one opening of the hydraulic circuit.

44 Claims, 10 Drawing Sheets

FIG. 21

CALIPER DISC BRAKE PROTECTIVE DEVICE AND CALIPER DISC BRAKE

RELATED APPLICATION

This application claims priority to, and is a U.S. National Stage Application of Patent Cooperation Treaty Application No. PCT/IT02/00747, filed on Nov. 28, 2002, the entirety of which is incorporated herein by reference.

FIELD OF THE INVENTION

The present invention relates to a device for protecting a brake-fluid pipe in disc-brake calipers, to a disc-brake caliper, and to a disc brake.

BACKGROUND OF THE INVENTION

In disc-brake calipers, it is known to form the brake-fluid duct between the half-calipers by means of a brake-fluid pipe arranged astride the caliper body.

The brake-fluid pipe is thus exposed to the risk of receiving impacts or knocks, in particular during normal maintenance operations during which the wheel rim has to pass very close to the pipe during removal and subsequent fitting of the hub.

Moreover, during normal operation of the vehicle, there is a real risk that the tyres may throw stones against the pipe.

Disc-brake calipers are in fact typically mounted astride the brake disc in a substantially upright position relative to the ground, with the brake-fluid pipe facing towards the ground, and are surrounded by the wheel rim which is open, that is, hollow on the side facing the interior of the vehicle.

Any stones thrown up by the tyre at the opposite end of the same axle when the vehicle is in motion may enter this opening and may strike the brake-fluid pipe violently.

Impacts against the brake-fluid pipe are extremely dangerous because they may damage the pipe or bend it in the region of its connections to the half-calipers, giving rise to cracks in the portion of the tube which is connected to the caliper body, resulting in highly dangerous leakages of brake fluid which compromise the efficiency of the braking system.

In the prior art there are no known constructions which can prevent the occurrence of the dangerous phenomena described.

The problem underlying the present invention is that of providing a protective device for the brake-fluid pipes of disc-brake calipers which overcomes the disadvantages mentioned with reference to the prior art.

These disadvantages are overcome effectively by a protective device according to claim 1.

Further embodiments of the protective device according to the invention are described in the subsequent claims.

BRIEF DESCRIPTION OF THE DRAWINGS

Further characteristics and the advantages of the resent invention will be explained further by the following description of some preferred and non-limiting embodiments thereof, in which.

DETAILED DESCRIPTION OF THE INVENTION

The following description relates without distinction both to unitary brake calipers, that is, calipers constructed in a single piece, and to multi-part brake calipers, that is, calipers comprising at least two half-calipers connected to one another, for example, by threaded connection means.

The elements or parts of elements which are common to the embodiments described below will be indicated by the same reference numerals.

The term "radial direction" is intended to define a direction substantially towards the centre of the brake disc astride which the disc-brake caliper is mounted.

The term "axial direction" is intended to define a direction substantially parallel to the axis of rotation of the brake disc.

The term "tangential direction" is intended to define a direction substantially parallel to a braking band of the brake disc, as well as perpendicular to the radial direction and to the axial direction.

With reference to the above-mentioned drawings, a disc-brake caliper unit for braking a vehicle wheel, not shown, is generally indicated 2.

A caliper body 6 is fixed to a portion of a wheel suspension. The caliper body 6 extends astride a braking disc 100 to an extent which is limited to a peripheral portion or braking band. Moreover, the disc is fixed to the wheel by known means.

The brake disc comprises a median plane (P) perpendicular to the axis of rotation of the disc as well as of the wheel to which the disc is fixed for rotation.

The caliper body 6 in turn has a median plane (P) which, for example, can be superimposed on the median plane of the disc that can be associated therewith, that is, which is superimposed on the median plane of the brake disc when the caliper body 6 is in the mounted configuration astride the brake disc.

The caliper body 6 comprises two side portions 6A and 6B which are positioned at least partially on opposite sides of the braking band of the disc, that is, on opposite sides of the median plane of the caliper body 6.

In other words, each of the two side portions 6A, 6B at least partially faces a portion of the braking band of the brake disc.

At least two single-acting pistons 10 are guided slidably in hydraulic braking cylinders arranged facing one another and formed within the side portions 6A, 6B.

Each side portion 6A, 6B of the caliper body 6 delimits a housing space 18 which extends predominantly in a tangential direction relative to the brake disc and is suitable for housing disc-brake pads.

The two side portions 6A, 6B are connected to one another by a central portion 26 in the region of lateral or tangential ends 20, 21 which are disposed at opposite ends of the side portions 6A, 6B along a tangential axis, so that the side portions 6A, 6B are disposed at least partially at the sides of the brake disc.

The central portion 26 extends astride the brake disc, and has side walls 22, 23 on opposite sides of the disc.

The term "side walls" does not necessarily mean that the central portion 26 has abutment surfaces for the side portions 6A, 6B which are disposed beside the disc.

According to one embodiment, for example, in calipers which are fixed, that is, not floating relative to the disc, and which are formed with a one-piece body, said side walls 22, 23 are provided with surfaces disposed at the sides of the part of the central portion 26 that forms a bridge over the disc in order to connect the side portions 6A, 6B; these surfaces delimit the bridge, for example, purely virtually, relative to the side portions 6A, 6B.

According to one embodiment, the central portions 26 interconnect the side portions 6A, 6B and are connected to the side portions in the head portions thereof, that is, at the tangential ends 20, 21 of these side portions, so as to take up merely a portion of the thickness of these side portions 6A, 6B in an axial direction. The portions of the head or tangential end portions 20, 21 which are left free by the central portion 26 form an area in which it is advantageous to form openings 24 for a hydraulic circuit; these openings will be described in greater detail below.

The central portion 26 covers angularly a portion of the brake disc, that is, a circular sector of the brake disc and has an overall "U"-shape so that, when the caliper body is in the mounted configuration astride the brake disc, a portion of the brake disc is housed in the concave portion or internal seat of the "U"-shape.

The central portion 26 comprises a pair of uprights 27 which constitute the arms of the "U", each upright 27 being connected to a side portion 6A, 6B, and a bridge portion 28 which is arranged astride the brake disc and interconnects the two uprights 27.

Each upright 27 comprises an inner face 30 facing axially towards the brake disc, an outer face 32 axially opposite the inner face 30, and a base surface 33 which faces radially towards the brake disc.

The bridge portion 28 comprises an inner inclined surface 34 facing substantially radially towards the brake disc and an outer inclined surface 36 facing away from the brake disc and from the inner inclined surface 34.

The bridge portion 28 comprises, in the region of an end facing tangentially in a direction away from the brake disc, a seat 38 which extends in an axial direction and has a cross-section shaped as an arc of a circle and, preferably, a semicircle.

Inside the caliper body there is a hydraulic circuit for supplying brake fluid to all of the pistons 10 of the caliper body 6. Each side portion 6A, 6B comprises ducts which extend substantially tangentially and which, in the region of each housing space 18, intersect the hydraulic braking cylinders in which the pistons 10 slide so that the brake fluid can exert a thrust against the pistons 10.

Moreover, said ducts extend along the side portions 6A, 6B so as to extend through them from end to end, that is, from each lateral end 20 to each opposite lateral end 21. These ducts are preferably formed by drills which are inserted in the side portions in directions such as to intersect the cylinders. In particular, the ducts are produced with several drilling strokes, that is, the drills are inserted at the lateral ends 20 and 21 of the side portions 6A, 6B and are moved forwards substantially tangentially towards the cylinders.

At least one further hole is then formed, preferably in an axial direction from the outside of the caliper body towards the housing space 18 so as to intersect the hydraulic circuit to allow for fluid communication of the hydraulic circuit of the caliper body with a duct disposed outside the caliper body and operatively connected to a brake-fluid pump, for the admission of brake fluid sent by the brake-fluid pump.

In particular, each of the two tangential ducts of each side portion advantageously has a bleed vent in one lateral end 21 of the side portion 6A, 6B to allow the hydraulic circuit to be bled.

Moreover, the side portions 6A, 6B and, in particular, these ducts, comprise the openings 24 of the hydraulic circuit, in the region of engagement portions 39 at the lateral ends 20 remote from the ends 21.

The hydraulic-circuit openings 24 are in fluid communication with one another in the region of the engagement portions 39 at the lateral ends 20 remote from the ends 21 comprising the bleed vents.

The fluid communication enables the brake fluid to be supplied to the two side portions 6A, 6B and the pistons of the two side portions 6A, 6B thus to be operated simultaneously.

The shape of the hydraulic-circuit openings 24, that is, the cross-section between the opening and a plane perpendicular to the median plane of the caliper body and extending through the opening, may take any form, for example, it may be a polygonal, circular or elliptical shape, preferably with polar symmetry, that is, a shape or cross-section which is symmetrical with respect to a point or pole.

Whatever geometrical shape the hydraulic-circuit openings 24 have, it is always possible to identify a centre 24' of the opening, that is, a reference point which, for example, coincides with the geometrical centre of the opening 24, when such a centre exists, or which in any case is included in a central portion of the opening.

The bleed vents are advantageously closed by plugs and the side portions 6A, 6B are put into fluid communication with one another by means of a brake-fluid pipe 40, operatively connected to the engagement portions 39.

The brake-fluid pipe 40 is fitted astride the brake disc as well as astride the central portion 26 to connect the hydraulic circuits provided in the side portions 6A and 6B.

In particular, the brake-fluid pipe 40 typically has a substantially straight portion 42 and two curved portions or sections 44 so that, when the pipe is in the fitted configuration on the caliper body, the straight portion 42 is arranged axially and the end parts of the curved portions 44 are arranged tangentially, substantially parallel to the brake-fluid ducts, and hence perpendicular to the engagement portions 39.

Typically, the ducts of the hydraulic circuit have recesses of trapezoidal cross-section in the engagement portions 39 and the end parts of the curved portions 44 advantageously have an axially symmetrical bulb-like shape so that, if the bulbs are clamped against the internal walls of the engagement portions by means of respective flanges positioned on the end walls of the curved portions, a linear, in particular circumferential, contact is brought about between the recesses and the bulb-shaped end portions, thus ensuring fluid-tightness.

Preferably, a sleeve 47 covers the straight portion 42 which is advantageously housed in the seat 38 of the central portion 26.

As shown in particular in FIGS. 1 to 5, each of the above-mentioned surfaces or faces of the central portion 26, that is, the inner face 30, the outer face 32, the base surface 33, the inner inclined surface 34, or the outer inclined surface 36, may advantageously constitute an abutment surface for a protective device 50 for the brake-fluid pipe 40 that can be associated with the caliper body 6.

The term "abutment surface" is intended to define a surface suitable for receiving a portion of the protective device 50 in abutment to enable the protective device 50 to be positioned and fixed on the caliper body 6, in particular astride the central portion 26 of the caliper body 6 and covering the brake-fluid pipe 40.

Moreover, the bearing surfaces 30, 32, 33, 34, 36 are advantageously positioned on the central portion 26 of the caliper body 6 in a manner such that the distance between the points of the said surfaces and the median plane of the caliper body, which is superimposed on the median plane of the brake disc that can be associated therewith, is less than the distance between the median plane of the caliper body and at least one opening centre 24' of the hydraulic-circuit opening 24.

According to one embodiment, the points of the bearing surfaces are spaced from the median plane by a distance less than the distance from the opening centre 24' which is positioned on the same side of the median plane of the caliper body as the said points of the bearing surface.

In other words, two planes parallel to the median plane of the caliper body and on opposite sides thereof, each extending through an opening centre 24', identify and include a portion of the caliper body comprising the surfaces that are suitable for forming bearing surfaces for the device for protecting the brake-fluid pipe.

For convenience, this portion of the caliper body may be defined as an inner portion, relative to an outer portion which is disposed outside the planes.

In other words, the bearing surfaces are never intersected by planes which are parallel to the median plane of the caliper body and outside of the opening centres, that is, which are not included between the median plane and the opening centres.

In other words, the bearing surfaces 30, 32, 33, 34, 36 are arranged in an inner portion of the caliper body which extends from the centres of the openings of the hydraulic circuit towards the median plane of the caliper body.

To enable the protective device 50 to be fixed to the caliper body 6, the caliper body 6 must have anchorage holes 52 in the bearing surfaces 30, 32, 33, 34, 36.

The protective device 50 advantageously has a shape and size such as to enable it to be fitted astride the central portion 26 and in abutment therewith, in a manner such as to cover the brake-fluid pipe 40.

The protective device 50 preferably comprises a shell 54 suitable for surrounding the brake-fluid pipe 40 and means 58 for fixing the shell 54 to the caliper body 6.

The shell 54 advantageously extends predominantly along a major axis X which extends in an axial direction.

The shell 54 comprises a crosspiece 62 which advantageously extends in a direction parallel to the major axis X and which is suitable for covering the straight portion 42 of the brake-fluid pipe 40.

Moreover, in the region of the opposite ends of the crosspiece 62, the shell 54 advantageously comprises two lateral shields 66.

In a plan view, the crosspiece 62 and the two lateral shields 66 adopt a "U"-shaped configuration in which the lateral shields 6 form the arms of the "U".

Each of the lateral shields 66 is suitable for covering a curved portion 44 of the brake-fluid pipe 40.

The "U"-shaped protective device 50 is suitable for enveloping and enclosing the central portion 26 and the brake-fluid pipe 40 so as to adjoin the engagement portions 39, enclosing the brake-fluid pipe 40.

Preferably, the shell 54 defines a recess 68 which is suitable for housing and thus surrounding the brake-fluid pipe 40.

Advantageously, the recess 68 is shaped to fit the brake-fluid pipe 40.

Moreover, when the protective device is in the fitted configuration, coupled with the central portion 26 of the caliper body 6, the recess 68 can constitute a chamber for housing the brake-fluid pipe.

According to one embodiment, the recess 68 is bounded on two sides, in other words, the crosspiece 62 and the lateral shields which delimit it, have an "L"-shaped cross-section.

Preferably, the crosspiece 62 and the lateral shields 66 comprise an upper wall 70 and a web 74 substantially perpendicular to the upper wall 70.

According to one embodiment, the upper wall 70 and the web 74 form the two arms of the "L" in cross-section.

According to a further embodiment, the protective device 50 has a plane of symmetry Y substantially perpendicular to the major axis X, as well as to the axial direction.

When the protective device 50 is in the fitted configuration on the caliper body, the plane of symmetry Y is superimposed on a plane of symmetry of the brake disc perpendicular to the axis of rotation of the brake disc.

Advantageously, said crosspiece 62 comprises at least one engagement system 78 for enabling the crosspiece 62 to be engaged on the brake-fluid pipe 40 and preferably on the straight portion 42 of the brake-fluid pipe 40.

According to one embodiment, the engagement system 78 comprises at least one tongue 80 bent into an "L"-shape.

Each tongue is advantageously resilient by virtue of the presence of notches 82, which separate it partially from the body of the protective device, and of respective joining portions 83, and is suitable for being engaged, for example by snap-engagement, directly on the brake-fluid pipe 40 or on the sleeve 47 which completely or partially covers the brake-fluid pipe 40.

Advantageously, in the region of each of the lateral shields 66, the upper wall 70 has means 58 for fixing the protective device 50 to the caliper body 6.

According to one embodiment, the fixing means 58 comprise at least one plate 86 which projects from a portion of the upper wall 70 of each lateral shield 66 in a direction substantially perpendicular to the upper wall 70 and on the side remote from the web 74.

When the protective device is in the fitted configuration for protecting the brake-fluid pipe 40, each plate 86 can face and abut the outer face 32 of a respective upright 27 of the bridge portion 28.

Moreover, when the protective device is in the fitted configuration on the central portion 26, each plate 86 faces inwardly with respect to a pair of parallel outer planes which are disposed on opposite sides of the median plane of the caliper body and which include and delimit the protective device, that is, each plate 86 faces towards the median plane, that is, away from the outer planes.

Preferably, the protective device comprises at least two plates 86, one for each lateral shield, so that the distance between the plates 86, taken in an axial direction, is no less than the distance between the outer faces 32 of the central portion 26, taken in an axial direction.

Advantageously, each plate 86 comprises a clamping hole 90 for enabling the protective device 50 to be clamped to the caliper body 6, for example, by threaded connection means.

It should be pointed out that the expression "threaded connection means" is intended to define all connections of releasable type which are characterized by the presence of at least one threaded body or screw which is engaged with an internally-threaded element, or stud bolts, tap screws, or screw systems with lock nuts, bolts, washers, and the like.

Alternatively, each plate 86 forms a connection to the caliper body 6 and, in particular, to the central portion 26 of the caliper body 6 by means of a form fit, in other words, each plate 86 is shaped to so as to fit on a corresponding surface of the central portion 26 of the caliper body 6 by force-fitting or by snap-engagement.

According to a further advantageous embodiment, two brackets or plates 86, connected to the upper wall 70 and to the web 74, respectively, project, for example, in a cantilever-like manner in the region of at least one lateral shield 66, the plates 86 extending on opposite sides of the web 74.

In other words, the brackets or plates 86 project from the web 74 or from the upper wall 70 towards the internal space delimited by the concave portion of the shell.

Preferably, each of the two plates 86 faces inwardly, that is, towards the median plane, that is, away from the outer planes which delimit the protective device.

Each plate 86 has a clamping hole 90 for the clamping of the protective device 50 to the caliper body 6 and is suitable for facing and abutting the outer face 32 of the upright 27.

Preferably, in one embodiment, the protective device also has weight-reducing holes 94 in the web 74.

The weight-reducing holes 94 are advantageously slot-shaped and preferably extend axially and radially along the crosspiece 62 and tangentially and radially in the lateral shields 66.

The weight-reducing holes not only help to reduce the mass of the protective device but also ensure air circulation in the region of the brake-fluid pipe, thus helping to cool the caliper body and the brake fluid.

In order to fit the protective device 50 on the caliper body 6 it is necessary to place the protective device 50 close to the caliper body 6 in the region of the brake-fluid pipe 40 and to insert the protective device 50 towards the brake-fluid pipe 40 in a tangential direction until the at least one plate 86 of the protective device bears in abutment with at least one corresponding bearing surface 30, 32, 33, 34, 36 of the central portion 26 of the caliper body, so as to align the clamping holes 90 of the protective device 50 with the corresponding anchorage holes 52 of the caliper body 6 and to bring about engagement between the engagement system 78 and the brake-fluid pipe 40.

In other words, the protective device is mounted on the caliper body by fitting the protective device on the central portion 26 of the caliper body 6, that is, by inserting the protective device so as to cover the central portion 26 of the caliper body 6 and hence the brake-fluid pipe 40.

The protective device is thus positioned so as to protect the brake-fluid pipe 40 completely since the pipe is housed inside the recess 68.

According to a further embodiment of the protective device 50, shown in FIGS. 10 to 18, the shell 54 which encloses the recess 68 has a "C"-shaped cross-section, that is, the recess 68 is bounded on three sides.

In particular, the shell 54 comprises an upper wall 70, a web 74 substantially perpendicular to the upper wall 70, and a lower wall 98, substantially parallel to the upper wall 70. In other words, in a cross-section taken in a plane perpendicular to the major axis X, the upper wall 70 and the lower wall 98 constitute the two arms of the "C".

According to one embodiment, the system 78 for the engagement of the crosspiece 62 on the brake-fluid pipe 40 comprises at least one pair of fins 102 which project from the crosspiece 62 towards the chamber 68 and are suitable for form coupling with the brake-fluid pipe 40.

Advantageously, the fins 102 are resilient and are suitable for engaging on the brake-fluid pipe 40 or on the sleeve 47 which covers the brake-fluid pipe 40.

Preferably, the coupling takes place by a force fit or an interference fit to permit snap-engagement of the crosspiece 62 with the brake-fluid pipe 40.

Advantageously, in the region of each of the lateral shields 66, the lower wall 98 has means 58 for fixing the protective device 50 to the caliper body 6.

According to one embodiment, the fixing means 58 comprise at least one plate 86 substantially parallel to the lower wall 98.

The plate 86 comprises a clamping hole 90 suitable for enabling the protective device 50 to be clamped to the caliper body 6, for example, by threaded connection means.

In particular, when the device 50 is in the fitted configuration for protecting the brake-fluid pipe 40, each plate 86 can face and abut the base surface 33 of a respective upright 27 of the bridge portion 28.

In order to fit the protective device 50 on the caliper body 6, it is therefore necessary to fit the protective device 50 on the brake-fluid pipe 40 so that the pipe is housed completely inside the recess 68, to snap-engage the fins 102 on the pipe 40, and to align the holes 90 of the protective device 50 with the corresponding anchorage holes 52 of the caliper body 6 to enable the threaded connection means to be inserted and the protective device 50 to be clamped to the caliper body 6.

The protective device 50 is thus positioned so as to protect the brake-fluid pipe 40 completely since the pipe 40 is housed inside the recess 68.

Figure 1:
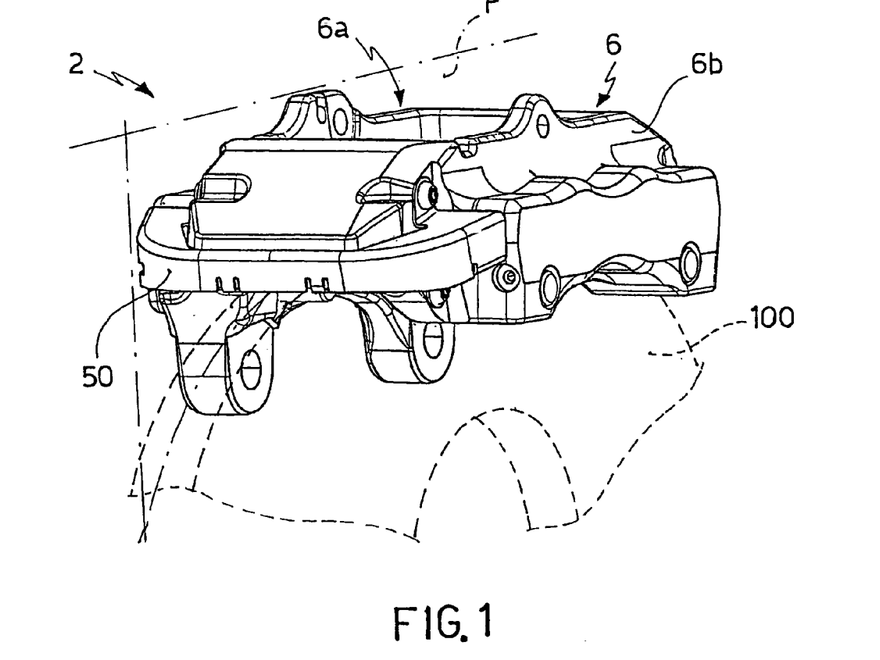
FIG. 1 is a perspective view of a disc-brake caliper with a protective device according to the invention.
Figure 2:
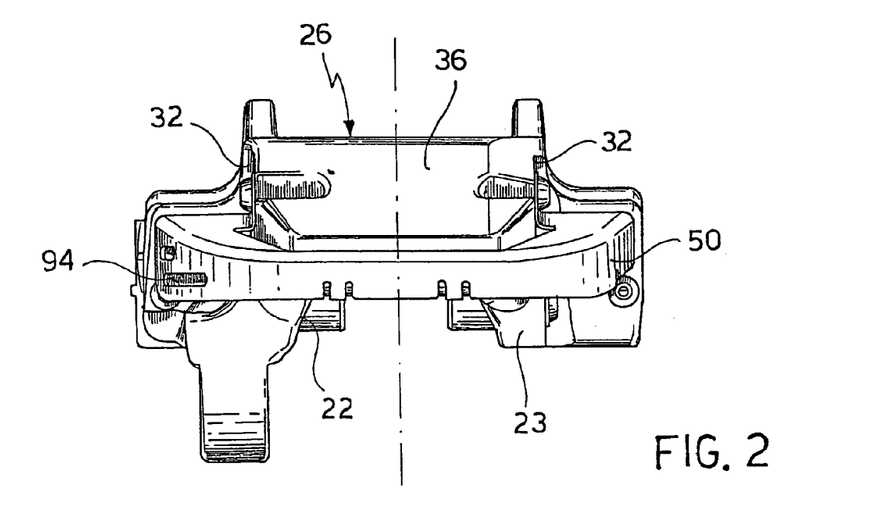
FIG. 2 is a front view of the disc-brake caliper with the protective device of FIG. 1.
Figure 3:
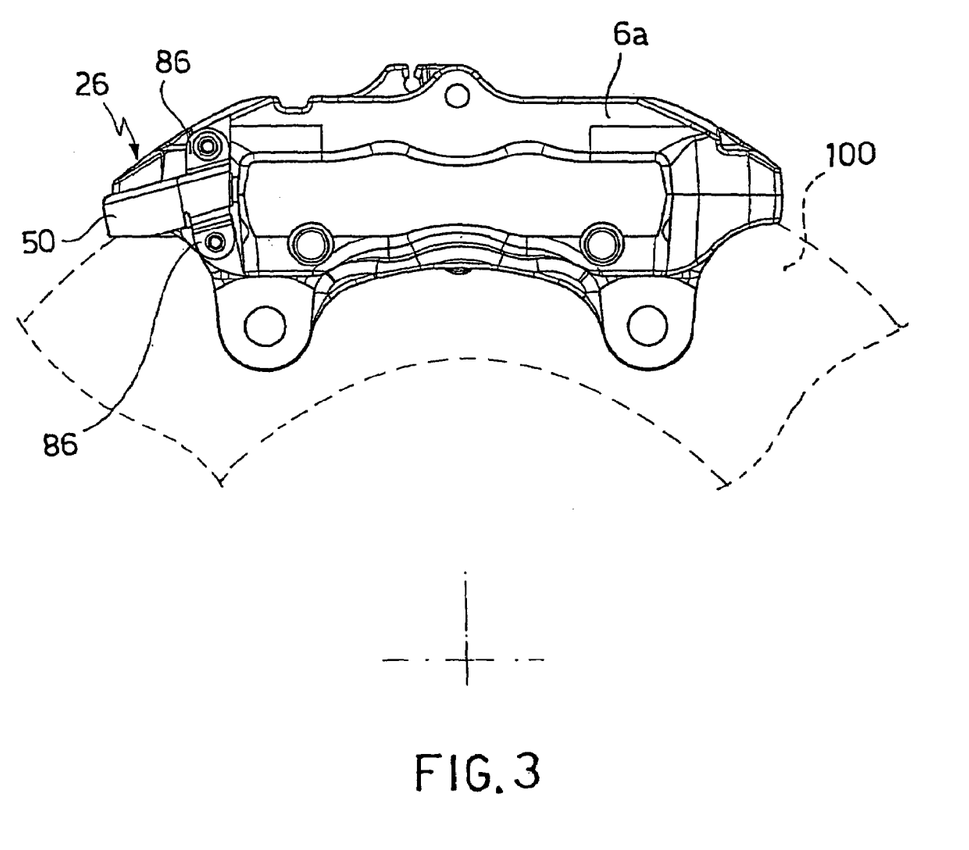
FIG. 3 is a side view of the disc-brake caliper with the protective device shown in FIG. 1.
Figure 4:
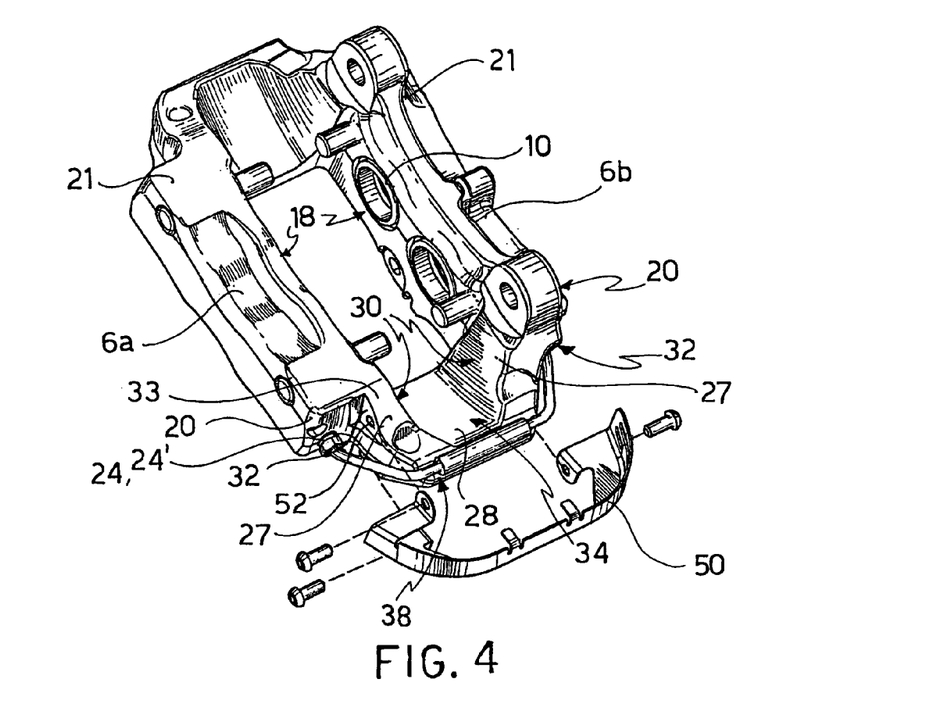
FIG. 4 is a view of the disc-brake caliper from below, with parts separated, with the protective device shown in FIG. 1.
Figure 5:
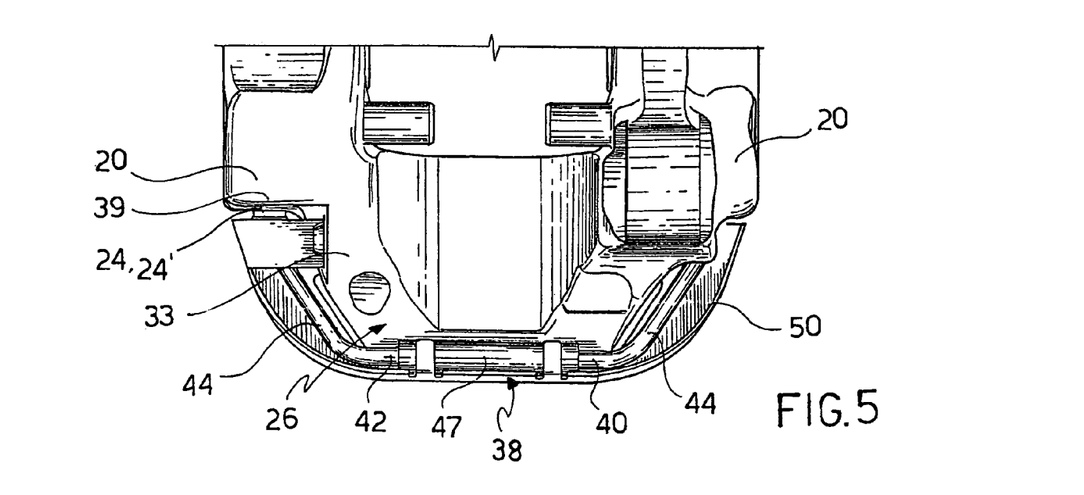
FIG. 5 is a partial view, from below, of a portion of the disc-brake caliper shown in FIG. 1.
Figure 6:
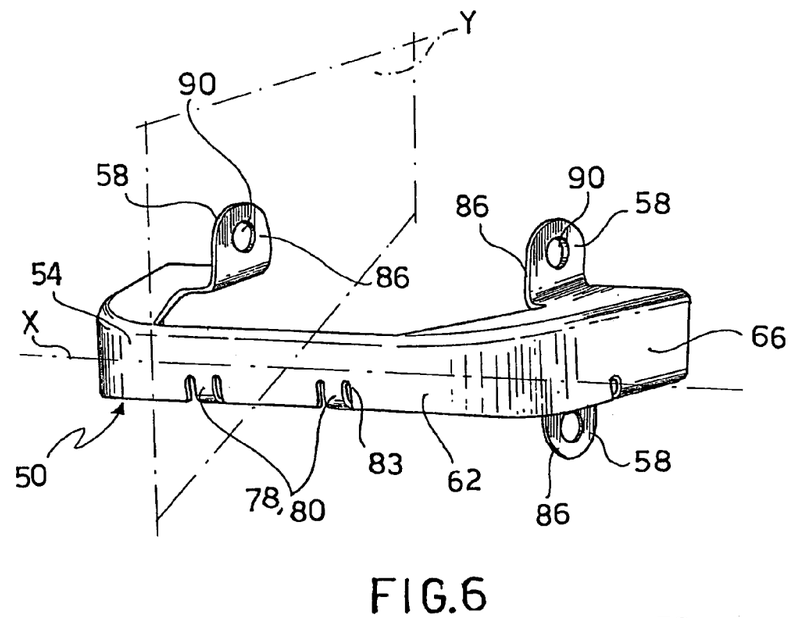
FIG. 6 is a front perspective view of a protective device according to one embodiment.
Figure 7:
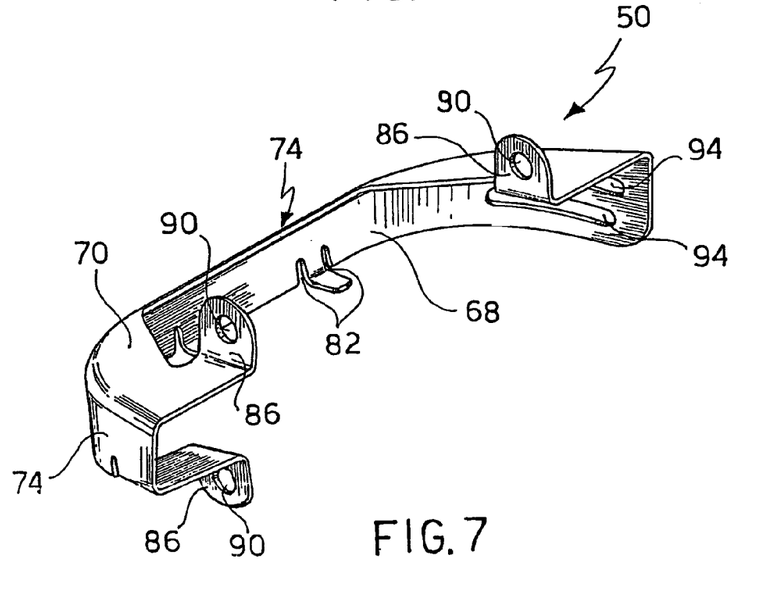
FIG. 7 is a rear perspective view of the protective device of FIG. 6.
Figure 8:
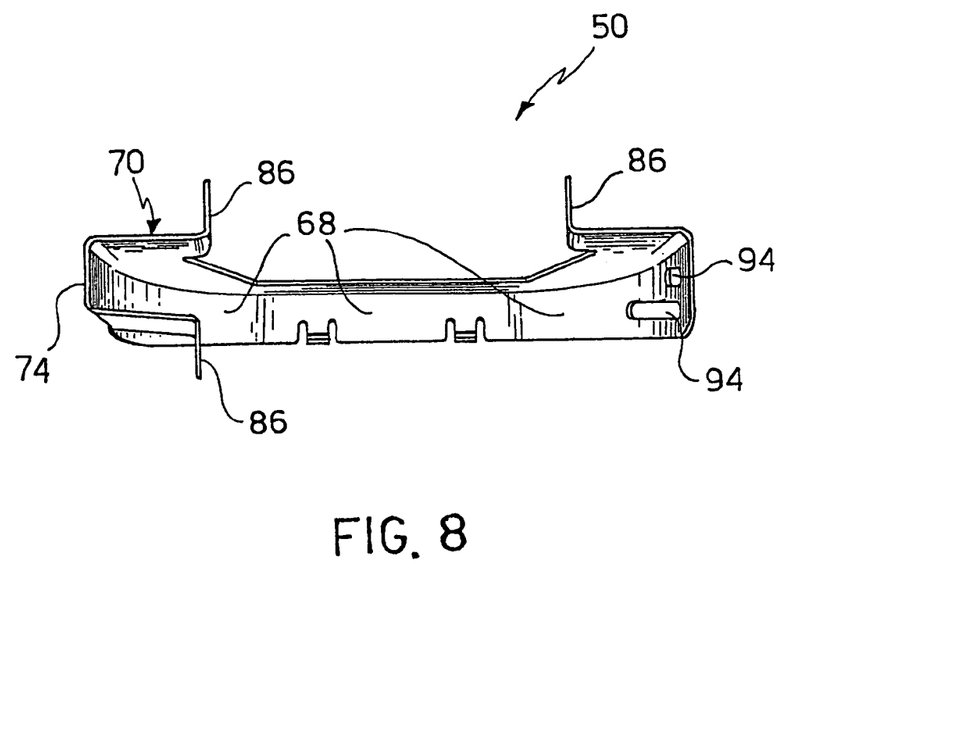
FIG. 8 is a rear view of the protective device of FIG. 6.
Figure 9:
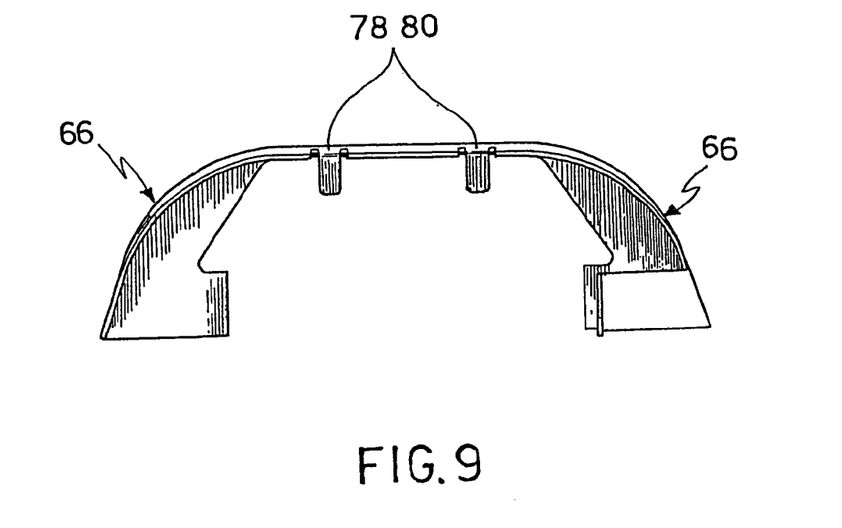
FIG. 9 is a plan view of the protective device of FIG. 6, from below.
Figure 10:
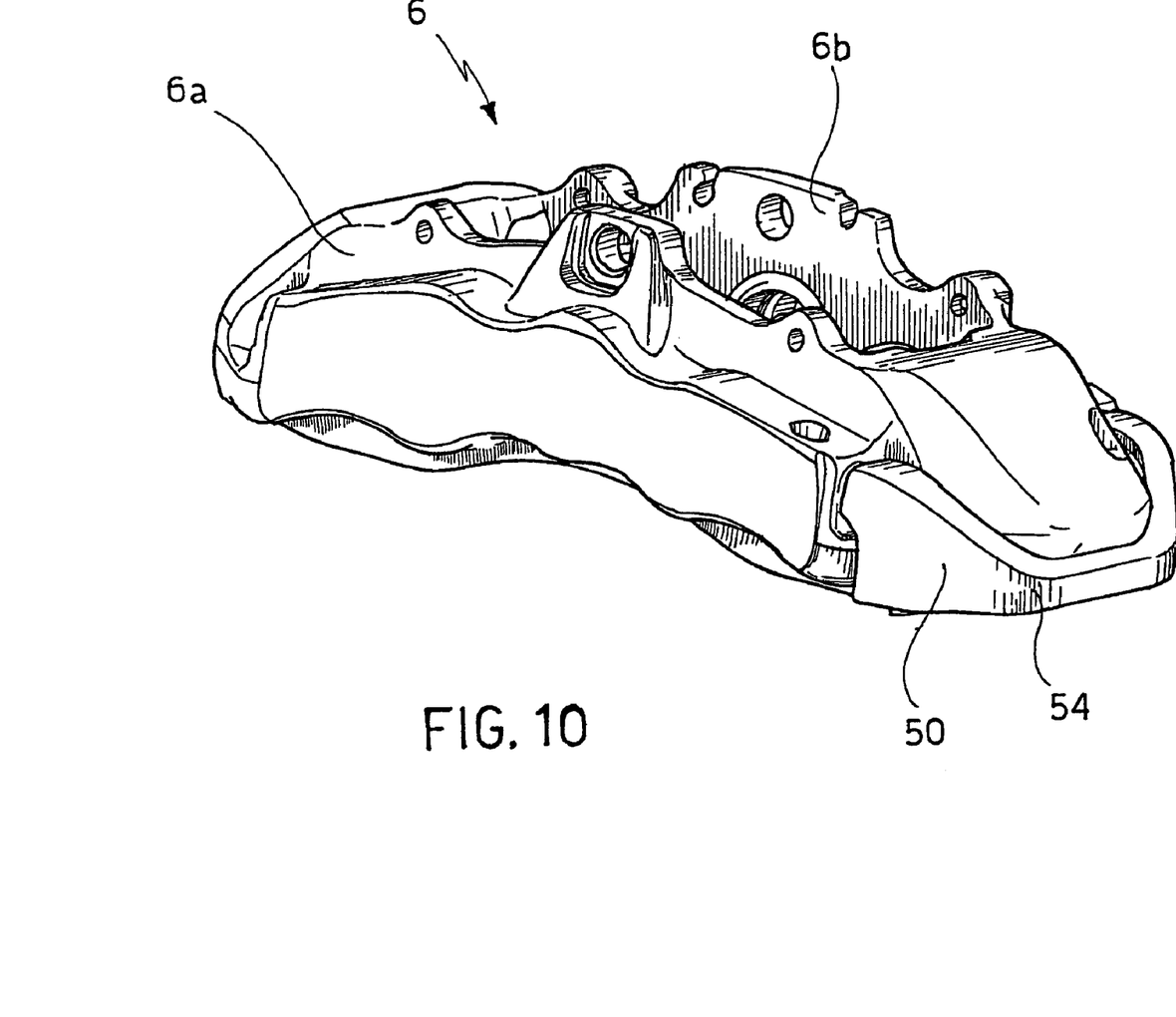
FIG. 10 is a perspective view of a disc-brake caliper with a protective device according to a further embodiment.
Figure 11:
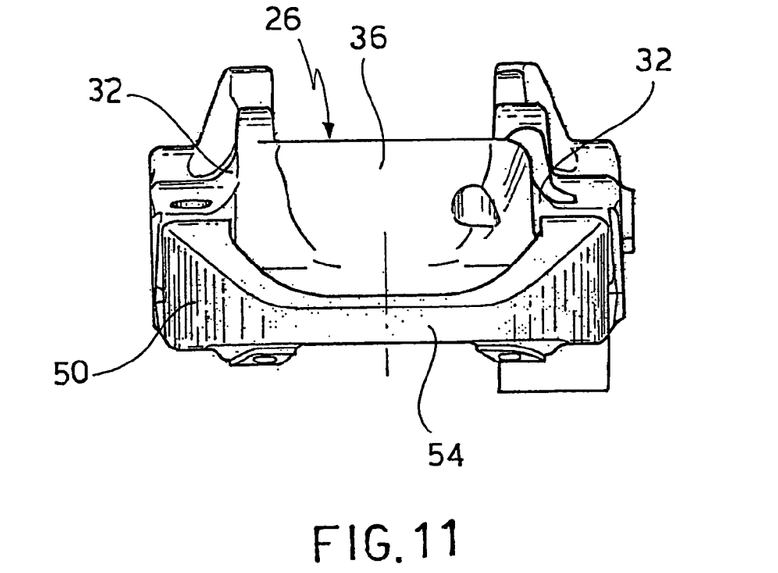
FIG. 11 is a front view of the disc-brake caliper of FIG. 10.
Figure 12:
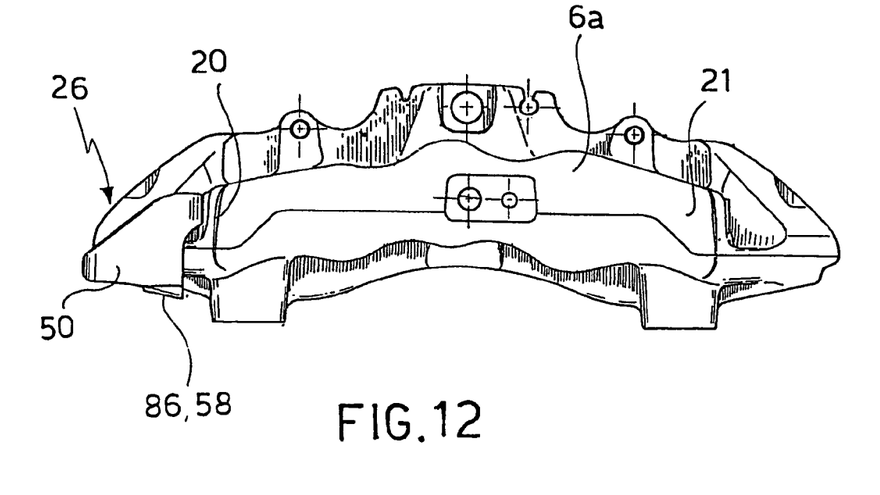
FIG. 12 is a side view of the disc-brake caliper of FIG. 10.
Figure 13:
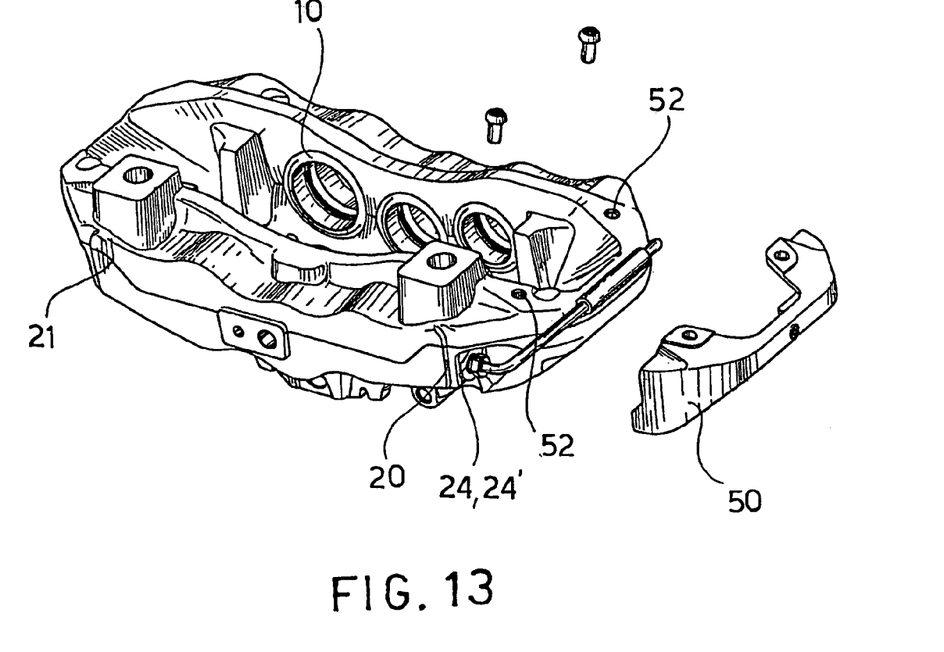
FIG. 13 is a view of the disc-brake caliper of FIG. 10 from below, with parts separated.
Figure 14:
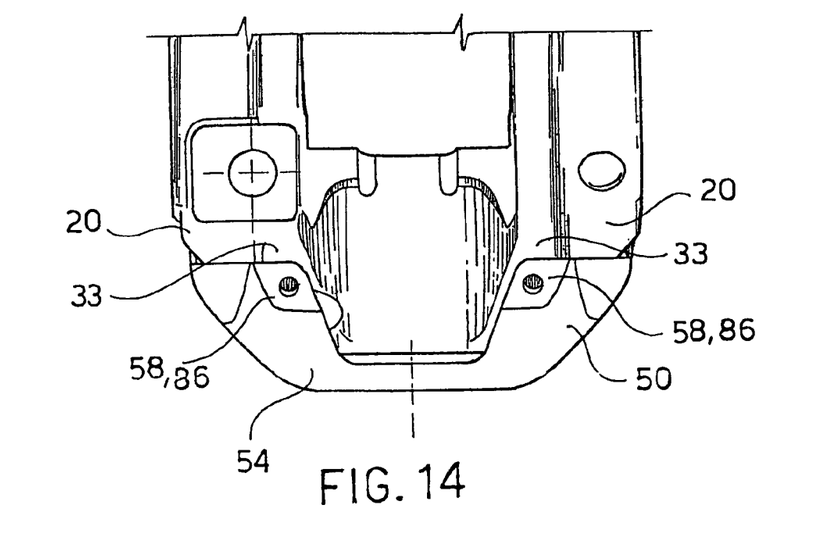
FIG. 14 is a partial view of a portion of the disc-brake caliper of FIG. 10, from below.
Figure 15:
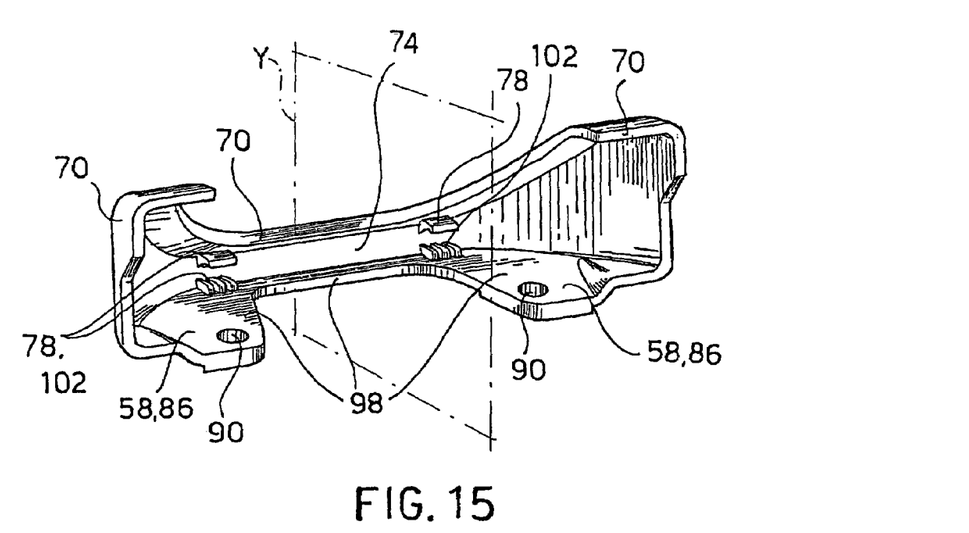
FIG. 15 is a perspective view of the protective device of the caliper of FIG. 10.
Figure 16:
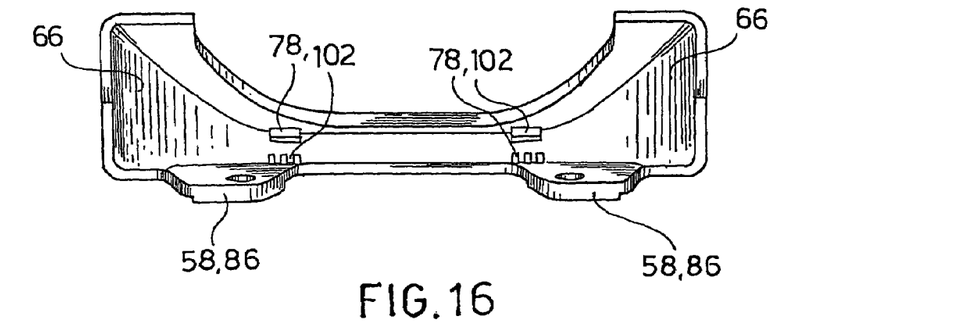
FIG. 16 is a rear view of the protective device of FIG. 15.
Figure 17:
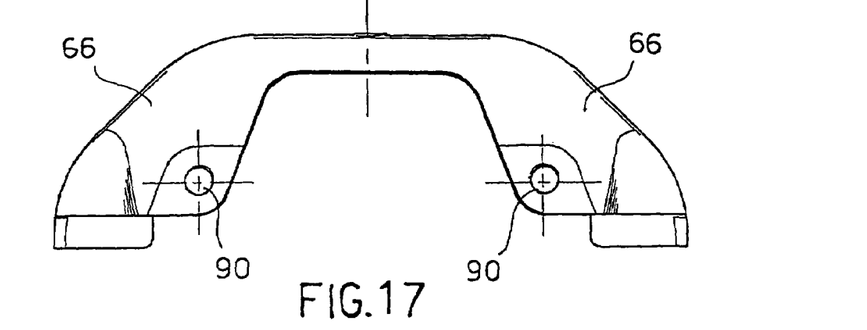
FIG. 17 is a plan view of the protective device of FIG. 15, from below.
Figure 18:
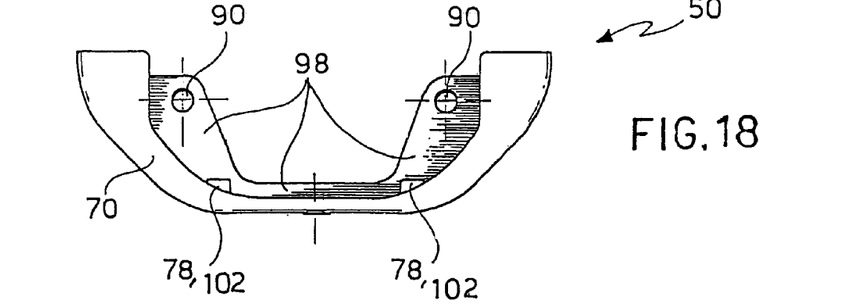
FIG. 18 is a plan view of the protective device of FIG. 15, from above.
Figures 19, 20, 21:
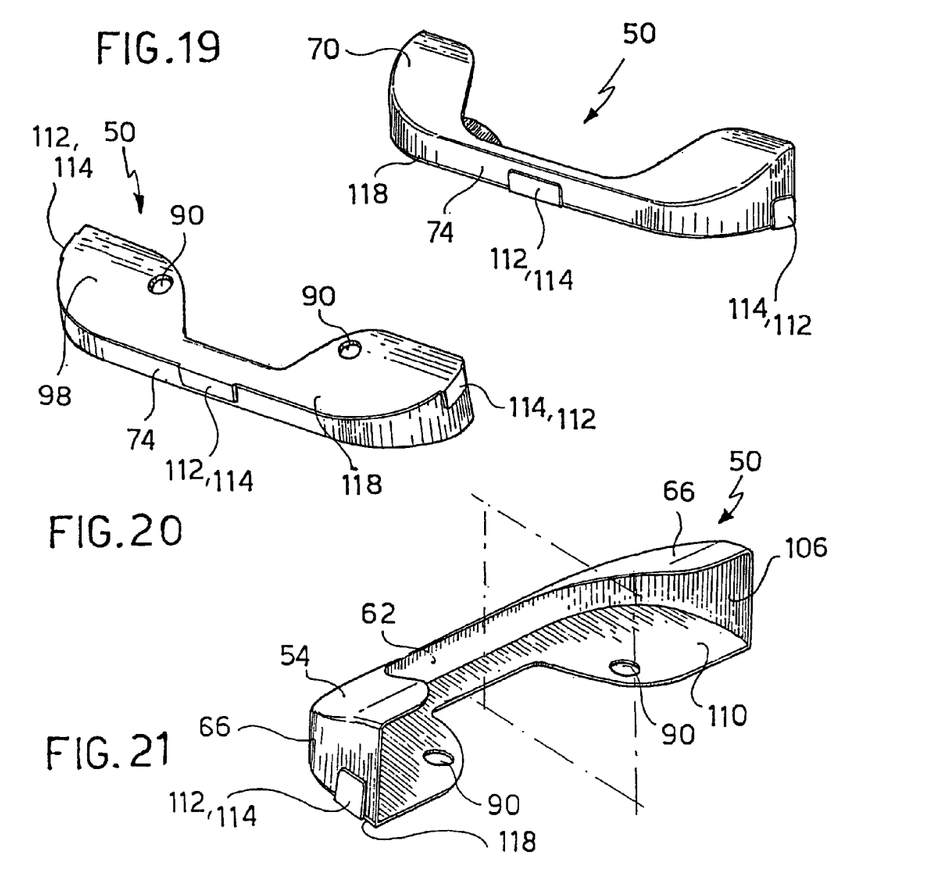
FIG. 19 is a front perspective view of a protective device according to a further embodiment.
FIG. 20 is a perspective view of the protective device of FIG. 19, from below.
FIG. 21 is a rear perspective view of the protective device of FIG. 19.

According to a further embodiment shown in FIGS. 19 to 21, the protective device 50 is formed in several parts and preferably in two parts.

In particular, according to a preferred embodiment, a protective device 50 having an overall "C"-shaped cross-section is constituted by a base 106, a cover 110, and means 112 for joining the base 106 to the cover 110.

Advantageously, the base 106 comprises an upper wall 70 and a web 74 substantially perpendicular to the upper wall 70 and the cover 110 comprises a lower wall 98 substantially parallel to the upper wall 70.

In a plan view, the base 106 and the cover 110 both have an overall "U"-shape suitable for form coupling with the central portion 26 of the caliper body 6.

According to one embodiment, the cover 110 comprises the joining means 112 and, in particular, at least one tab 114 which projects from a lateral edge 118 of the cover 110 and extends substantially perpendicularly relative to the cover 110.

Advantageously, the tab 114 is suitable for engagement with a portion of the web 74 of the base 106.

According to a further embodiment, the base 106 comprises the joining means 112 and, in particular, at least one tab 114 which projects from the web 74 of the base 106 and is suitable for engagement with a portion of the cover 110.

It can be seen that the protective devices described overcome the disadvantages mentioned with reference to the prior art.

Moreover, the protective device disclosed can be fitted conveniently and quickly.

Advantageously, the protective device is releasable and can thus be removed quickly to allow any maintenance operations to be performed on the brake-fluid pipe.

A further advantage consists of the lightness of the protective device which is an important characteristic since the brake caliper constitutes a non-suspended mass.

Moreover, the engagement system of the protective device requires no structural modification of conventional brake calipers such as, for example, the production of brackets or stiffening webs to which to fix the protective device, which would increase costs and make the caliper body heavier.

Above all, such brackets or webs would constitute obstacles to the accessibility of the brake-fluid pipe whereas the protective device described, once fitted, permits quick and easy access to the brake-fluid pipe and to its attachments to the caliper body.

Moreover, the protective device disclosed can advantageously also be fitted on caliper bodies not originally provided with protective devices since no additional support elements are required for a conventional caliper body and it suffices to form anchorage holes in a suitable bearing surface of the caliper body.

The device of the present invention ensures protection with an ability to absorb knocks which may occur during the fitting and removal of the wheels, as well as possible impacts by stones thrown up by the wheels.

Moreover, the means for fixing the protective device to the caliper body are positioned in protected portions of the caliper body, that is, on surfaces of the central portion of the caliper body and hence in a position which is intrinsically protected from any knocks either due to stones thrown up by the wheels when the vehicle is in motion or due to normal maintenance operations.

Furthermore although, on the one hand, the protective device prevents contact of the brake-fluid pipe with the wheel rim both during the fitting and during the removal of the wheel, on the other hand, the presence of lateral shields of rounded shape facilitates the maintenance operation.

It is worth mentioning that the rounded shape of the protective device may constitute a type of lead-in for the edge of the wheel rim which can slide thereon.

Moreover, the protective device can be made of metal, with the advantage of a thin and strong structure.

The protective device may also advantageously be made of synthetic material and in particular, of either thermoplastic or thermosetting plastics material.

The protective device made of plastics material is above all inexpensive and easy to produce with the use of moulds which enable any curved shape to be conferred on the device so as to follow the profile of the brake-fluid pipe and of the caliper body perfectly, thus limiting the space occupied by the caliper body and also improving its appearance.

It is important to limit the radial dimensions of the caliper body because the gap which is present between the caliper body and the inner portion of the wheel rim is particularly small.

The protective device also ensures an improvement in the appearance of the unit constituted by the wheel and by the disc brake since it hides the brake-fluid pipe, at the same time following the profile of the caliper body.

Naturally, in order to satisfy contingent and specific requirements, a person skilled in the art will be able to apply to the above-described protective devices many modifications and variations all of which, however, are included within the scope of the invention as defined by the appended claims.

What is claimed is:

1. A protective device which can be associated with a caliper body of a disc-brake caliper, said caliper body having a median plane of the caliper body which can be superimposed on a median plane of the disc arranged perpendicularly relative to an axis of rotation of the disc, the caliper body being arranged with a central portion astride the brake disc so that side walls of the central portion are arranged on opposite sides of the disc, said side walls being connected to side portions so that the side portions are at least partially at the sides of the disc, each of the side portions comprising an opening of a hydraulic brake-fluid circuit defining an opening centre, the openings being in fluid communication with one another by means of a brake-fluid pipe arranged astride the central portion, said pipe supplying brake fluid between the side portions, the protective device comprising:

a shell for protecting the brake-fluid pipe; and a fixing means for fixing the shell to the caliper body, wherein said fixing means has at least one plate which, when the protective device is in the fitted configuration on the caliper body in order to arrange the shell so as to protect the brake-fluid pipe, faces and abuts at least one bearing surface of the central portion of the caliper body, wherein the distance between the points of the at least one bearing surface of the caliper body from the median plane of the caliper body being less than the distance between the median plane of the caliper body and the opening centre of at least one opening of the hydraulic circuit, so that said brake fluid pipe and said opening a hydraulic brake-fluid circuit is protected from objects thrown up by wheels.

2. A protective device according to claim 1, wherein said protective device extends along a major axis.

3. A protective device according to claim 2, further comprising a crosspiece parallel to the major axis.

4. A protective device according to claim 3, further comprising two lateral shields positioned at two opposite ends of the crosspiece.

5. A protective device according to claim 3, wherein the crosspiece and the lateral shields are arranged in a "U"-shaped configuration suitable for form coupling with the central portion of the caliper body.

6. A protective device according to claim 4, wherein each of the lateral shields is suitable for housing a curved portion of the brake-fluid pipe.

7. A protective device according to claim 4, wherein each of the lateral shields is shaped to fit a curved portion of the brake-fluid pipe.

8. A protective device according to claim 1, wherein the device is formed in at least two pieces.

9. A protective device according to claim 8, wherein the protective device comprises a base, a cover, and joining means for joining the base to the cover.

10. A protective device according to claim 9, wherein the cover comprises joining means for joining the cover to the base.

11. A protective device according to claim 10, wherein the joining means comprise at least one tab suitable for engagement with a portion of the web of the base.

12. A protective device according to claim 8, wherein the base comprises joining means for joining the base to the cover.

13. A protective device according to claim 1, wherein the shell comprises at least one engagement system, the engagement system being suitable for forming a snap-connection between the shell and the brake-fluid pipe.

14. A protective device according to claim 13, wherein the engagement system comprises at least one tongue bent into an "L"-shape.

15. A protective device according to claim 14, wherein the shell comprises notches and joining portions in the region of a connection portion of the shell and the at least one bent "L"-shaped tongue.

16. A protective device according to claim 13, wherein the engagement system comprises at least one pair of fins.

17. A protective device according to claim 1, wherein the shell delimits a recess suitable for housing the brake-fluid pipe.

18. A protective device according to claim 17, wherein the recess is shaped to fit the brake-fluid pipe.

19. A protective device according to claim 17, wherein the shell bounds the recess on two sides.

20. A protective device according to claim 17, wherein the shell bounds the recess on three sides.

21. A disc-brake caliper comprising at least one protective device according to claim 1, the protective device being fitted so as to protect the brake-fluid pipe.

22. A disc brake comprising a caliper according to claim 21.

23. A protective device according to claim 1, wherein said protective device further maintains a plane of symmetry.

24. A protective device according to claim 1, wherein said protective device further maintains an overall "U"-shaped configuration suitable for form coupling with the central portion of the caliper body.

25. A protective device according to claim 1, wherein the shell is suitable for form coupling with the brake-fluid pipe.

26. A protective device according to claim 1, wherein the shell is shaped to fit the brake-fluid pipe.

27. A protective device according to claim 1, wherein the shell has an "L"-shaped cross-section.

28. A protective device according to claim 1, wherein the shell comprises an upper wall and a web perpendicular to the upper wall.

29. A protective device according to claim 1, wherein the shell has a "C"-shaped cross-section.

30. A protective device according to claim 1, wherein the shell comprises an upper wall, a web and a lower wall.

31. A protective device according to claim 1, wherein the fixing means comprise at least one coupling by threaded connection means.

32. A protective device according to claim 1, wherein the shell comprises at least one weight-reducing hole.

33. A protective device according to claim 1, wherein the device is formed in one piece.

34. A protective device according to claim 1, wherein the plates project from the shell towards the central portion of the caliper body.

35. A protective device according to claim 1, wherein the plates face towards the median plane of the caliper body.

36. A protective device according to claim 1, wherein the plates comprise at least one clamping hole suitable for enabling the device to be clamped to the caliper body by threaded connection means.

37. A protective device according to claim 1, wherein the plates achieve form coupling with the central portion of the caliper body.

38. A protective device according to claim 1, wherein said protective device is made of metal.

39. A protective device according to claim 1, wherein said protective device is made of a synthetic or plastics material.

40. A disc-brake caliper formed by two side portions connected to one another, comprising a central portion having at least one bearing surface for a protective device according to claim 1.

41. A disc-brake caliper formed in a single piece, comprising a central portion having at least one bearing surface for a protective device according to claim 1.

42. A disc brake comprising a protective device according to claim 1.

43. A caliper arrangement for a disk brake, said arrangement comprising,
    a caliper body, having first and second side walls each side wall having first and second respective outer surfaces defining the edges of the caliper body, first and second inner surfaces, connection walls between said outer and inner surfaces and a median plane between said first and second side walls;
    openings for a hydraulic brake-fluid circuit disposed on said connection walls of each of said first and second side walls of said caliper body;
    a brake fluid pipe configured to place said openings of said hydraulic brake-fluid circuit in fluid communication with one another; and
    a shell for protecting the brake fluid pipe having at least one plate, wherein said plate is attached at a first end to said first inner surface of said first side wall and at a second end to said second inner surface of said second side wall, wherein said plate covers both said brake fluid pipe and said openings in said hydraulic brake-fluid circuit and wherein the attachment of said plate to said first and second inner side walls is inside of said openings of a hydraulic brake-fluid circuit, closer to the median of the caliper body.

44. The caliper arrangement as claimed in claim 43, wherein said connection walls are disposed in a substantially perpendicular arrangement between said outer surfaces and said inner surfaces such that the attachment of said plate to said first and second inner side walls is inside of said perpendicularly arranged openings of said hydraulic brake-fluid circuit.

* * * * *